United States Patent Office 3,197,397
Patented July 27, 1965

3,197,397
HYDROCRACKING CATALYST REGENERATION OF A CRYSTALLINE ZEOLITE COMPOSITE
Carlyle G. Wight and Robert H. Hass, Fullerton, Calif., assignors to Union Oil Company of California, Los Angeles, Calif., a corporation of California
No Drawing. Filed June 25, 1962, Ser. No. 205,103
9 Claims. (Cl. 208—111)

This invention relates to the catalytic hydrocracking of high-boiling hydrocarbons to produce therefrom lower boiling hydrocarbons, boiling for example in the gasoline range. The invention is directed specifically to novel methods for effecting regeneration of certain types of water-sensitive hydrocracking catalysts, whereby a more complete recovery of the original fresh hydrocracking activity is obtained. The type of catalysts here concerned are those comprising a crystalline, zeolitic, molecular sieve cracking base, upon which is deposited, preferably by ion-exchange, a Group VIII metal hydrogenating component. It has been found that hydrocracking catalysts of this nature, in their oxidized state, are particularly susceptible to damage when they are contacted with water at temperatures between about 200° and 900° F.

In the regeneration of such catalysts by oxidation under conventional conditions, it has been found that the water vapor generated by combustion of hydrocarbonaceous deposits on the catalyst, and/or water vapor present in the regeneration gases, damages the catalyst in such a way that the activity regained after regeneration is substantially less than its initial fresh activity. According to this invention, such damage is greatly reduced by effecting the entire combustion-regeneration at temperatures above 900° F. This entails heating the deactivated catalyst in its reduced state up to the minimum 900° F. temperature in a non-oxidizing environment, and then beginning the oxidation at temperatures above 900° F. and maintaining such temperatures until the desired regeneration is completed. It has been found that a substantial partial pressure of water vapor can be tolerated by the oxidized catalyst at temperatures above about 900° F., but that at temperatures between about 200° F. and 900° F., even minor amounts of water effect a deactivation which is not reversible by subsequently drying the catalyst.

It is, therefore, a principal object of this invention to provide economical methods for regenerating the specific catalysts concerned herein so as to restore their fresh activity to a greater extent than has heretofore been possible. The overall objective is to extend the total active life of such catalysts, and to obtain the most efficient use thereof during their total life span. Other objectives will be apparent from the detailed description which follows.

It is well known in catalytic hydrocracking that the catalyst activity declines gradually during use, the rate of deactivation depending to a large extent upon the severity of hydrocracking conditions, and the feedstock employed. This deactivation is ordinarily not permanent, but is due at least largely to the formation of combustible deposits upon the catalysts, e.g., coke, tars, sulfur, nitrogen compounds and the like. When the catalysts has delined to an undesirably low level of activity, its activity may be restored to a considerable degree by combustion at, e.g., 500–900° F. with oxygen-containing gases, which combustion is usually followed by a hydrogen reduction step.

We have found, in reference to the specific catalysts here concerned, that this conventional regeneration procedure does not restore such catalysts to their original activity, but rather to a much lower activity level such that temperatures 50–150° F. higher are required to give equivalent conversions, as compared to the fresh catalysts. Further, it has been found that such catalysts may be restored essentially to their original activity, if the regeneration is carried out under carefully controlled conditions, and in the complete absence of water vapor. However, it is extremely difficult to exclude water entirely from the regeneration zone, because some of the deactivating deposits on the catalysts, e.g., coke and tars, contain hydrogen which is converted to steam by combustion. Moreover, it is undesirable from an economic standpoint to employ regeneration gases which have been completely freed of water. Normally, the regeneration gases used are composed of flue gases mixed with minor proportions of air. Such gases always contain some water vapor, and to reduce the water content to the desired level would require an expensive drying operation. In operations where the regeneration off-gases are recycled to the regeneration zone, the water vapor generated by combustion would also need to be removed. It would therefore be highly desirable to provide regeneration methods which are effective even though small amounts of water vapor are present. This invention rests upon our basic discovery that such small amounts of water vapor can be tolerated with little or no damage to the catalysts, if the entire oxidation sequence is conducted at temperatures between about 900° and 1,400° F., and if at all other times, as when the catalyst is being heated up to the minimum oxidation temperature, oxygen is entirely excluded from the catalyst.

We are unable to account with certainty for the observed damaging effects of water vapor during regeneration. It does however appear to be associated with an effect upon the hydrogenating component of the catalyst, rather than the cracking base itself. It has been observed in the case of some hydrocracking catalysts (other than those here preferred) that the activity of the cracking base itself is damaged by contact with water. This type of damage is apparently not avoided by the regeneration technique of this invention, but where the cracking base itself is hydrolytically stable, substantially complete recovery of fresh activity can be obtained, and in any event damage to the hydrogenating component can be greatly reduced, by the regeneration techniques here described.

In the normal course of regeneration, the deactivated catalyst at the end of a hydrocracking run is stripped with hydrogen at 700–1,000° F. in order to remove as completely as possible the volatile hydrocarbons. The stripped catalyst is then lowered in temperature to about 300–500° F., as by means of cool hydrogen or flue gases, and the oxidative regeneration is then commenced in this low temperature range, as by bleeding air or oxygen into the flue gas stream. Low temperatures are used initially in order to control more easily the exothermic oxidation, which is then allowed to proceed in several waves by periodically raising the temperature until a final temperature of about 800–1,000° F. is reached. It is normally considered unnecessary to exceed temperatures of about 900° F. during the oxidation. It will be appreciated that during this oxidation sequence, different types of catalyst deposits will be oxidized at different temperatures. The deposits rich in hydrogen are normally oxidized at lower temperatures than the highly carbonaceous deposits. Hence it will be seen that most of the water generated by combustion will be formed in the relatively low temperature ranges of about 400–700° F., and it is precisely in this temperature range where the catalysts of this invention are most seriously damaged by water vapor.

Since in the present case, the normal low temperature oxidation step is to be avoided, it is unnecessary to carry out the initial lowering of temperature of the catalyst bed after the hydrocracking run. The regeneration sequence may be initiated at substantially the terminal temperature of the hydrocracking run (which is normally about 700–850° F.) by first cutting out the hydrocarbon feedstock, and stripping the catalyst bed with hydrogen at, e.g., 700–1,000° F., and 0–1,000 p.s.i.g. Alternatively, any other inert, non-oxidizing gas such as nitrogen or flue gases may be used for the stripping operation, and simultaneously the catalyst is raised to the temperature at which oxidation is to be commenced. If hydrogen is used for stripping, it is necessary to flush out any remaining hydrogen prior to the introduction of oxygen-containing gases, and this is preferably accomplished by the use of nitrogen or flue gases. It should be noted that during this stripping-heating step, it is unnecessary to exclude water because the catalyst is in a reduced state.

After the catalyst has been suitably stripped of volatile hydrocarbons, flushed of hydrogen, and brought to the minimum oxidation temperature of 900° F., air or oxygen is then bled into the regeneration gas stream, which at this point may consist of flue gases containing the normally incident amounts of water vapor. In initiating the oxidation at above 900° F., it is necessary to maintain a more careful control over oxygen concentration in the regeneration gases, at least during the initial period of oxidation, in order to avoid any exothermic temperature rise which might exceed the thermal stability threshold of the catalyst, which is normally about 1,300–1,400° F. The oxidation is preferably commenced with only about 0.2 to 3 p.s.i. partial pressure of oxygen in the oxidizing gases, and the oxygen concentration is gradually increased as the regeneration progresses, until at the end 100% air may be used. The oxidation is preferably conducted at total pressures of about 50–400 p.s.i.g., but lower or higher pressures may be used if desired. The complete oxidation cycle normally requires about 8–48 hours, depending largely upon the amount of deactivating deposits on the catalyst, and is preferably terminated at a temperature of about 1,000–1,200° F.

The regeneration technique of this invention is advantageous regardless of the water content of the input regeneration gases. Even if bone-dry input gases are used, some water is always generated during the oxidation, which will cause considerable damage under conventional conditions. Conversely, even if very wet input gases are used, the resulting damage is less than would occur under conventional conditions using such wet gases. However, for optimum results, it is preferred to limit the water content of the input oxidation gases to a value such that, at the regeneration pressure, the absolute partial pressure of water vapor attributable to the input gases will be less than about 4 p.s.i.

Following the oxidation step, the catalyst is normally subjected to a reducing treatment with hydrogen at temperatures of 0–1,400° F. for a period of about 6–8 hours. It is preferable to use substantially dry hydrogen for this pre-reducing treatment, i.e., to maintain the water partial pressure at below about 0.5 p.s.i., especially during the initial period when the catalyst is mostly in the oxidized state. Further, it is preferable, even when dry hydrogen is used, to maintain reducing temperatures above about 900° F., at least during the initial period, because additional water is formed in reducing the hydrogenating component from its oxide form to the free metal. Where the catalyst contains more than about 2% by weight of hydrogenating metal, it is especially desirable to maintain reducing temperatures above 900° F. until most of the metal oxide is reduced. It is further preferred to initiate the reducing treatment at relatively low pressures of, e.g., 0–400 p.s.i.g., and then after most of the metal oxide has been reduced, to increase the pressure gradually up to the desired hydrocracking pressure.

At the end of the reducing treatment, the temperature of the hydrogen stream is lowered to the level desired for initiation of the hydrocracking run, and the feed is cut into the hydrogen stream. After the feedstock is brought in for the hydrocracking run, the water content of the input gases becomes of less significance, since the catalyst is in the reduced state. In fact, small amounts of water are desirable during the hydrocracking run in order to improve activity and decrease catalyst deactivation rates, as disclosed in copending application Serial No. 200,063, about 0.0075% to 2% by weight of water, based on feed, filed June 5, 1962. Specifically, it is preferred to maintain in the hydrocracking zone during the run.

From the foregoing, it will be seen that the complete hydrocracking-regeneration sequence of this invention involves four distinct phases as follows:

(1) The hydrocracking run itself in which the stated optimum proportions of water vapor are preferably maintained.

(2) A non-oxidative preheating and stripping period in the absence of feedstock, in which the temperature of the catalyst is raised to at least about 900° F.

(3) The actual oxidative regeneration period at temperatures above 900° F., during which water can be tolerated.

(4) A hydrogen reduction period at 0–1,400° F. in the absence of feed, preferably utilizing temperatures above about 900° F. during the first part of the period.

The water-sensitive catalysts of this invention are composed of a major proportion of a dehydrated zeolitic crystalline molecular sieve cracking base, upon which is deposited a minor proportion of a Group VIII metal hydrogenating component. The molecular sieve cracking bases are composed substantially exclusively of silica and alumina and one or more exchangeable zeolitic cations such as hydrogen, sodium, magnesium, calcium, etc. They are further characterized by relatively uniform crystal pores having a diameter between about 6 and 14 Angstroms. Various crystal forms of such molecular sieves are now available and suitable for use herein, e.g., those of the "X," "Y" or "L" crystal types may be employed. It is preferred to employ molecular sieves having a relatively high $SiO_2/Al_2O_3$ mole ratio, e.g., between about 2.5 and 8. The most active forms are those wherein the exchangeable zeolitic cations are hydrogen and/or a divalent metal such as magnesium, calcium or zinc. In particular, the Y molecular sieves having crystal pore diameters of about 9–10 A., and wherein the $SiO_2/Al_2O_3$ ratio is about 5, are preferred, either in their hydrogen form, or a divalent metal form, preferably magnesium. Normally, such molecular sieves are prepared first in the sodium or potassium form, and the monovalent metal is ion-exchanged out with a divalent metal, or where the hydrogen form is desired, with an ammonium salt followed by heating to decompose the zeolitic ammonium ion and leave a hydrogen ion. It is not necessary to exchange out all of the monovalent metal; the final compositions may contain up to about 6% by weight of NaO, or equivalent amounts of other monovalent metals. Zeolites of this nature are more particularly described in Belgian Patents Nos. 598,582, 598,682, 598,683 and 598,686.

The foregoing cracking bases are compounded, as by impregnation, with from about 0.1% to 10% (based on free metal) of a Group VIII metal hydrogenating component, e.g., an oxide or sulfide of cobalt, nickel, platinum, palladium, rhodium or iridium, or the corresponding free metals, or any combination thereof. The noble metals platinum, palladium, rhodium and iridium, are preferred, and it is further preferred that such metals be added to the cracking base by ion-exchange. This can be accomplished by digesting the zeolite with an aqueous solution of a suitable compound of the desired hydrogenating metal wherein the metal is present in a cationic form, and then reducing to form the free metal, as described for example in Belgian Patent No. 598,686.

The regenerated catalysts of this invention may be employed for the hydrocracking of substantially any mineral oil fraction boiling above the conventional gasoline range, i.e., above about 300° F., and usually above about 400° F., and having an end-boiling-point up to about 1,000° F., but preferably not greater than about 850° F. These feedstocks may be sulfur-free, or they may contain up to about 5% by weight of sulfur, in the form of organic sulfur compounds. They may also contain organic nitrogen compounds, by if nitrogen compounds are present, it is ordinarily necessary to utilize hydrocracking temperatures in the upper ranges hereinafter defined. Specific feedstocks contemplated comprise straight-run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like.

Hydrocracking conditions to be employed herein fall within the following ranges:

TABLE 1

|  | Operative | Preferred |
|---|---|---|
| Temperature, °F | 400-850 | 500-750 |
| Pressure, p.s.i.g | 500-5,000 | 750-2,000 |
| H₂/oil ratio, s.c.f./b | 1,000-15,000 | 2,000-10,000 |
| LHSV | 0.1-10 | 0.5-5 |

Depending upon the severity of the hydrocracking conditions, and the refractoriness of the feed, it will be observed that the activity of the catalyst will have declined considerably after a period of time ranging between a few hours to several months. When the activity has declined to an uneconomic level, the flow of feedstock is terminated, and the regeneration cycle described above is initiated.

The following examples are cited to illustrate the invention and the results obtainable, but are not be construed as limiting in scope:

*Example I*

This example illustrates the successful regeneration of a Y molecular sieve hydrocracking catalyst containing 0.5% by weight of palladium added by ion-exchange, and wherein about 37% of the ion-exchange sites were occupied by magnesium, and about 46% by hydrogen ions (46% "decationized"). The SiO₂/Al₂O₃ mole-ratio of the catalyst was about 5, and the magnesium content was about 1.9% by weight.

The original, fresh activity of this catalyst was such that, in a hydrocracking activity test at 1,000 p.s.i.g., 1.5 LHSV and 8,000 s.c.f./b. of hydrogen, a conversion to 400° F. end-point products of 50% by volume was obtainable at a hydrocracking temperature of 542° F. after 36 hours on stream, using as feed a hydrogenated coker distillate gas oil having a boiling range of about 400-800° F. This activity declined during use to a level such that practically no conversion was obtainable at a temperature of 688° F., the other conditions remaining the same. The deactivated catalyst was then regenerated by:

(1) Stripping with hydrogen at atmospheric pressure for 2 hours at 700–950° F. and then at 950° F. for 5 hours;

(2) Oxidizing at atmospheric pressure and 925° F. over a period of 6 hours, using nitrogen-oxygen mixtures of gradually increasing oxygen content, from 1.5% to 5% by volume, then with air for 1 hour at 950° F., and finally with 100% oxygen for 16 hours at 950° F.;

(3) Reducing the oxidized catalyst with dry hydrogen for 1 hour at 950° F. and atmospheric pressure, and finally at 1,000 p.s.i.g. and 700° F. for 2.5 hours.

The regenerated catalyst was then tested for hydrocracking activity under the same conditions specified above for the fresh catalyst, and after 36 hours on stream it was found that 50% conversion was obtainable at 548° F., which is only 6° F. higher than the corresponding temperature required with the fresh catalyst. It is thus apparent that the catalyst was regenerated to substantially is original, fresh activity.

In contrast to the foregoing, when the deactivated catalyst was subjected to the same regeneration sequence, except that the oxidizing step (2) was initiated at a temperature of 400° F., and then gradually raised over the first 6 hours to 935° F., a regenerated catalyst of much lower activity was obtained. Its activity was such that the temperature required for 50% conversion after 36 hours on stream was at least about 610° F., or about 70–75° F. higher than the corresponding temperature required with the fresh catalyst.

*Example II*

To demonstrate further that the results in Example I are due to low-temperature hydration of the catalyst, and not to other complicating factors involved in the regeneration, the following experiment was carried out:

A portion of the fresh catalyst used in Example I, in its initial oxidized state resulting from calcining in air, was heated gradually from 400° to 950° F. over a period of 8 hours while passing wet air (saturated with H₂O at 115° F.) at atmospheric pressure through the catalyst. After a brief nitrogen purge, the catalyst was reduced with hydrogen for 3 hours at 700° F. and 1,000 p.s.i.g.

The resulting catalyst was then tested for hydrocracking activity as in Example I, and it was found that, after 18 hours on-stream, a temperature of 655° F. was required to obtain 55% conversion, while the untreated fresh catalyst gave 55% conversion after 18 hours on stream at a temperature of only 525° F. Thus, the catalyst lost 130° F. in hydrocracking temperature advantage as a result of wet air treatment.

Upon repeating the foregoing wet air treatment at temperatures entirely within the range of 950–1,000° F., the resulting catalyst, after 18 hours on-stream, is found to give 55% conversion at temperatures of 530–535° F., which substantially duplicates the original activity.

*Example III*

To illustrate the desirable effect of steam during the actual hydrocracking run, two comparative runs were carried out using as feed a hydrofined California coker distillate gas oil boiling over the range of 380–800° F. and containing about 10 p.p.m. of nitrogen and 19 p.p.m. sulfur. The catalyst in each run was a 50/50 copelleted mixture of (1) powdered Linde MB 5390 isomerization catalyst (a "decationized," or hydrogen form, of Y molecular sieve loaded with 0.5% Pd), and (2) a powdered activated alumina upon which was distended 25% by weight of nickel oxide. In each run, the conditions were:

Pressure, p.s.i.g. _____ 1,500.
LHSV _____ 1.0.
H₂/oil ratio, s.c.f./b. _____ 8,000.
Temperature _____ Gradually raised from 600° F. to maintain 50% conversion to 400° F. end-point products.

In run A, no water was added, while in run B, 0.2% by weight of water was added as butanol to the feed. In run A, at the end of 104 hours on-stream, a temperature of 623° F. was required to maintain a 50.1% conversion to 400° F. end-point product. In run B however, at the end of 110 hours, the temperature was only 617° F. to maintain a conversion of 50.2%. This difference of 6° F. represents a substantial difference in catalyst activity, equivalent to an absolute conversion difference of about 7%. In other words, if the temperature in run A were lowered to 617° F. at 104 hours, the conversion would be only about 43%.

It is thus apparent that the addition of water had a substantial effect in maintaining catalyst activity. This is further reflected in lower catalyst-deactivation rates, for in run A, when the hydrocracking temperature reached 617° F., it was necessary to raise the temperature about 7° F. per day in order to maintain conversion, while in run B, when the temperature reached 617° F., the corresponding temperature-increase requirement was only about 3° F. per day.

When other molecular sieve hydrocracking catalysts within the scope of the invention are substituted in the foregoing examples, generally similar differential results are obtained, with respect to the presence or absence of steam.

It is not intended that the invention should be limited to the details described above since many variations may be made by those skilled in the art without departing from the scope or spirit of the following claims.

We claim:

1. A catalytic hydrocracking process in combination with an intervening catalyst regeneration step, said catalyst being a water-sensitive composite of a Group VIII noble metal hydrogenating component deposited upon a crystalline, zeolitic molecular sieve cracking base comprising silica, alumina and at least one exchangeable cation, which comprises:
   (A) contacting a hydrocarbon feedstock plus added hydrogen with said catalyst under hydrocracking conditions including a temperature between about 400° and 850° F., and continuing said contacting until said catalyst has become substantially deactivated;
   (B) terminating the flow of hydrocarbon feedstock to said deactivated catalyst and raising the catalyst temperature to above about 900° F. in a stream of hydrogen while stripping volatile hydrocarbons therefrom;
   (C) subjecting the stripped and preheated catalyst, still at a temperature above about 900° F., to oxidative regeneration at temperatures limited to the range of about 900° to 1,400° F. but below the temperature at which said catalyst becomes thermally unstable, in contact with a stream of oxygen-containing regeneration gases, and continuing said oxidative regeneration for a time sufficient to burn off a desired major portion of deactivating combustible deposits on said catalyst;
   (D) subjecting the oxidized catalyst from step (C) to reduction with hydrogen at temperatures between about 0° and 1,400° F., and during the terminal portion of said reduction, adjusting the catalyst temperature to the level desired for initiating a new hydrocracking run; and
   (E) re-establishing a hydrocracking contacting sequence with hydrocarbon feedstock as specified in step (A).

2. A process as defined in claim 1 wherein said oxygen-containing regeneration gases in step (C) comprise air, flue gases and normally incident, substantial amounts of water vapor.

3. A process as defined in claim 1 wherein the oxygen content of said regeneration gases is gradually increased during the regeneration from a low level to a high level, and controlled so as to avoid any exothermic rise in catalyst temperature to values above about 1,400° F.

4. A process as defined in claim 1 wherein said hydrogen reduction step (D) is initiated at a temperature within the range of about 900° and 1,400° F., and maintained at a temperature within said range until at least the major portion of said hydrogenating component has been reduced from its oxidized state to the free metal.

5. A process as defined in claim 1 wherein said catalyst is essentially a molecular sieve of the Y crystal type containing a zeolitic cationic component from the class consisting of hydrogen and divalent metals, and wherein said hydrogenating component is a noble metal incorporated by ion-exchange into said molecular sieve.

6. A process as defined in claim 1 wherein said hydrocracking step (A) is carried out in the presence of about 0.0075% to 2% by weight of water, based on hydrocarbon feedstock.

7. A method for regenerating a hydrocracking catalyst at the end of a low-temperature hydrocracking run terminating at a temperature below about 850° F., said catalyst being a water-sensitive composite of a Group VIII noble metal hydrogenating component deposited upon a crystalline, zeolitic molecular sieve cracking base comprising silica, alumina and at least one exchangeable cation, which comprises:
   (A) cutting off the flow of hydrocarbon feedstock to said catalyst while continuing the flow of hydrogen;
   (B) incrementally raising the temperature of said hydrogen stream over a period of time to strip volatile hydrocarbons from said catalyst and raise its temperature to a value between about 900° and 1,400° F.;
   (C) terminating the flow of hydrogen and flushing the catalyst bed with an inert gas to remove hydrogen;
   (D) subjecting the stripped and preheated catalyst, still at a temperature above about 900° F., to oxidative regeneration at temperatures limited to the range of about 900° to 1,400° F. but below the temperature at which said catalyst becomes thermally unstable, in contact with a stream of oxygen-containing regeneration gases, and continuing said oxidative regeneration for a time sufficient to burn off a desired major portion of deactivating combustible deposits on said catalyst; and
   (E) reducing the oxidized catalyst with hydrogen at temperatures between about 0° and 1,400° F.

8. A process as defined in claim 7 wherein said catalyst is essentially a molecular sieve of the Y crystal type containing a zeolitic cationic component from the class consisting of hydrogen and divalent metals, and wherein said hydrogenating component is a noble metal incorporated by ion-exchange into said molecular sieve.

9. A process as defined in claim 7 wherein said regeneration by oxidative combustion is carried out using a regeneration gas mixture comprising air, flue gases, and normally incident, substantial amounts of water vapor.

References Cited by the Examiner

UNITED STATES PATENTS

| | | | |
|---|---|---|---|
| 2,749,287 | 6/56 | Kirshenbaum | 252—416 |
| 2,799,626 | 7/57 | Johnson et al. | 208—110 |
| 2,983,670 | 5/61 | Seubold | 208—111 |
| 3,069,349 | 12/62 | Meiners | 208—85 |
| 3,069,362 | 12/62 | May et al. | 252—419 |
| 3,039,953 | 6/63 | Eng | 208—26 |

ALPHONSO D. SULLIVAN, *Primary Examiner.*